United States Patent [19]
Phillips et al.

[11] Patent Number: 5,655,565
[45] Date of Patent: Aug. 12, 1997

[54] ABOVE-GROUND TANK AUTO-LIMITER

[75] Inventors: Paul Phillips, White Hall; Rick E. Puffer, Muskegon; James F. Biesecker, Grand Haven, all of Mich.

[73] Assignee: EBW, Inc., Muskegon, Mich.

[21] Appl. No.: 601,524

[22] Filed: Feb. 14, 1996

[51] Int. Cl.$^6$ .................... F16K 31/26; F16K 33/00
[52] U.S. Cl. .................. 137/413; 137/430; 137/432; 137/445; 137/448; 141/59; 141/198
[58] Field of Search .................... 137/409, 413, 137/430, 432, 442, 444, 445, 448, 433; 141/59, 198

[56] References Cited

U.S. PATENT DOCUMENTS

| | | | |
|---|---|---|---|
| 1,268,947 | 6/1918 | Fell | 137/448 |
| 2,098,131 | 11/1937 | Bluhm | 137/104 |
| 3,078,867 | 2/1963 | McGillis et al. | 137/416 |
| 5,010,915 | 4/1991 | Johnson | 137/423 |
| 5,027,870 | 7/1991 | Butterfield | 141/198 |
| 5,095,937 | 3/1992 | Le Blanc et al. | 137/432 |
| 5,141,019 | 8/1992 | Le Blanc et al. | 137/432 |
| 5,174,345 | 12/1992 | Kesterman | 141/198 |
| 5,235,999 | 8/1993 | Lindquist et al. | 137/433 |
| 5,388,622 | 2/1995 | Phillips | 141/198 |
| 5,427,137 | 6/1995 | Bowen | 137/433 |
| 5,472,012 | 12/1995 | Wood et al. | 137/430 |

*Primary Examiner*—George L. Walton
*Attorney, Agent, or Firm*—Young & Basile, P.C.

[57] ABSTRACT

An above-ground tank auto-limiter is provided for preventing the overflow of fluid in storage tanks. The auto-limiter includes a valve assembly insertible downward through the top of a fill pipe of the fuel storage tank. The valve assembly has a cylindrical valve housing providing a fluid flow passage directing fuel downward into the storage tank under pressure. A hollow cylindrical float is provided in the valve assembly and is coaxially mounted along the outside surface of the valve housing leading into the storage tank. The float moves vertically to slide freely along the lower portion of the valve housing with the fluctuation of the fuel level within the tank. A series of linkage assemblies communicate the cylindrical float to valve doors. The valve doors prevent any fluid flow from passing through the fluid flow passageway when the doors are in the closed position. Bleed valves disposed in the valve assembly above the valve doors function independently from the linkage assemblies and valve doors to allow a certain amount of excess fuel that is captured within the valve housing when the fluid flow passageway is closed to bleed into the storage tank when pressure in the valve assembly is released.

17 Claims, 10 Drawing Sheets

FIG·8

ABOVE-GROUND TANK AUTO-LIMITER

FIELD OF THE INVENTION

The present invention is directed to a float actuating shut-off valve for terminating the flow of fluid into a storage tank to prevent overfilling of the tank.

BACKGROUND OF THE INVENTION

The valve disclosed, while useful in other applications is particularly well adapted for controlling the filling of above ground fuel storage tanks. These tanks are filled from tank trucks by means of a large diameter hose which is sealingly coupled to the upper end of the fill pipe during the filling operation. Because of the relatively large capacity of the storage tanks, a relatively high flow rate during the filling operation is desirable and flow rates in the general range of 400 gpm are typical. At these high flow rates, it is quite common the tank is overfilled resulting in a spill. As much as 35 gallons of fuel may be involved in such a spillage. To prevent this spillage from contaminating the soil, it is now required in many locations that the fill pipe be equipped with an overfill storage container. However, prevention of overfilling of the tank is obviously the most desirable solution.

Monitoring of the fuel level within the tank during the fill operation presents a problem in that the sole access to the interior of the tank is via the fill pipe. Various sensing devices which will give a continuous reading of the fuel level within the tank during the filling operation have been proposed, however, typically these devices give a gauge reading to the fuel delivery man, who may not be paying close enough attention to the gauge to prevent a spill.

To prevent overfilling, many present day above ground storage tanks are provided with a float actuated valve which closes when the level of fuel within the above ground storage tank rises to a predetermined level, for example when the tank is 95% full. Most of these valves stop the incoming flow of fuel, but a substantial quantity, typically 25 to 30 gallons of fuel, remains in the supply hose between the float actuated shut off valve at the fill pipe and the shut off valve on the tank truck.

Previously known float actuated shut off valves prevent the filling of the storage tank beyond its capacity, but they do not solve the main problem created by overfilling, namely, the trapping of 25 to 30 gallons of fuel in the supply hose between the fill pipe and the shut off valve on the tank truck. The present invention is directed to a solution to the aforementioned concern.

SUMMARY OF THE INVENTION

According to the present invention, a valve assembly is provided extending downward through the top of an above-ground fuel storage tank. The valve assembly includes a cylindrical valve housing mounted to the lower end of the fill pipe which extends downward through a riser welded to the top of the storage tank. The valve housing provides a fluid flow passageway in which incoming fuel is directed downward into the storage tank under pressure.

A hollow cylindrical float is provided at the bottom of the valve assembly and is coaxially mounted along the outside surface of a pipe leading into the storage tank. The float slides vertically along the pipe with the fluctuation of the fuel level in the storage tank. A series of linkage assemblies connect the float to a centrally disposed pivot pin connected to a pair of valve doors. A valve seat is provided in the fluid flow passageway such that when the valve is closed against the valve seat, fluid flow is prevented from passing through the fluid passageway.

A check ball valve is provided in the fluid flow passageway upstream with respect to the doors. The check ball valve bleeds excess fuel above the valve door into the storage tank. When the valve doors close and fuel flow stops, a certain amount of excess fuel is trapped in the valve housing above the valve door. When fluid flow is shut off, and the pressure is relieved, the check ball unseats from the check valve seat and fuel is allowed to bleed through the orifice into the storage tank. The bleed may also be configured as a flexible membrane wherein the flexible membrane expands across a pair of annular extensions extending inwardly into the flow path forming a recess therebetween. An upper aperture allows for fuel to fill behind the flexible membrane such that the membrane moves against the valve door when in the closed position. As the fuel is pumped into the storage tank, a portion of the fuel is trapped in the flexible membrane so that the flexible membrane expands against the side of the valve door. When the fuel is shut off, and the pressure is released, the flexible membrane recedes from the stretched position and excess fuel is allowed to bleed between the flexible membrane and the valve door such that the fuel flows to the storage tank.

Another embodiment includes a poppet valve in a bore provided in a recessed structure in the fluid flow passageway upstream from the valve doors. A check ball and spring are disposed within the counterbore of the poppet valve. A check valve seat is created within the counterbore of the poppet valve such that the check ball seats on the check valve seat due to the incoming fuel pumped into the fuel tank. When the fuel pump stops, the spring pushes the check ball away from the check valve seat and any excess fuel above the poppet valve is allowed to bleed through the bore provided in the poppet valve. The poppet valve may be mounted horizontally through the housing wall and through the dash pot wall which surrounds and supports the popper valve. A horizontally mounted ball communicates with the atmospheric pressure such that if any vacuum is created in the poppet valve, the check ball becomes unseated from its valve seat and atmospheric pressure relieves the vacuum. When the check ball is unseated, the excess fuel can drain into the storage tank.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

The valve assembly of the present invention takes the form of a valve housing adapted to be threadably mounted at the lower end of the fill pipe to a storage tank. An elongated hollow drop tube extends downwardly from the valve housing into the storage tank. At the lower end of the drop tube, a cylindrical float is slidably received on the exterior of the drop tube. Actuating rods extend upwardly from the float into the valve housing to be coupled to actuating linkages for a butterfly valve and/or poppet valve. The valve assembly of the present invention includes five different embodiments, of which the last embodiment is the preferred embodiment and the others are alternatives to this preferred embodiment.

Figure 1:
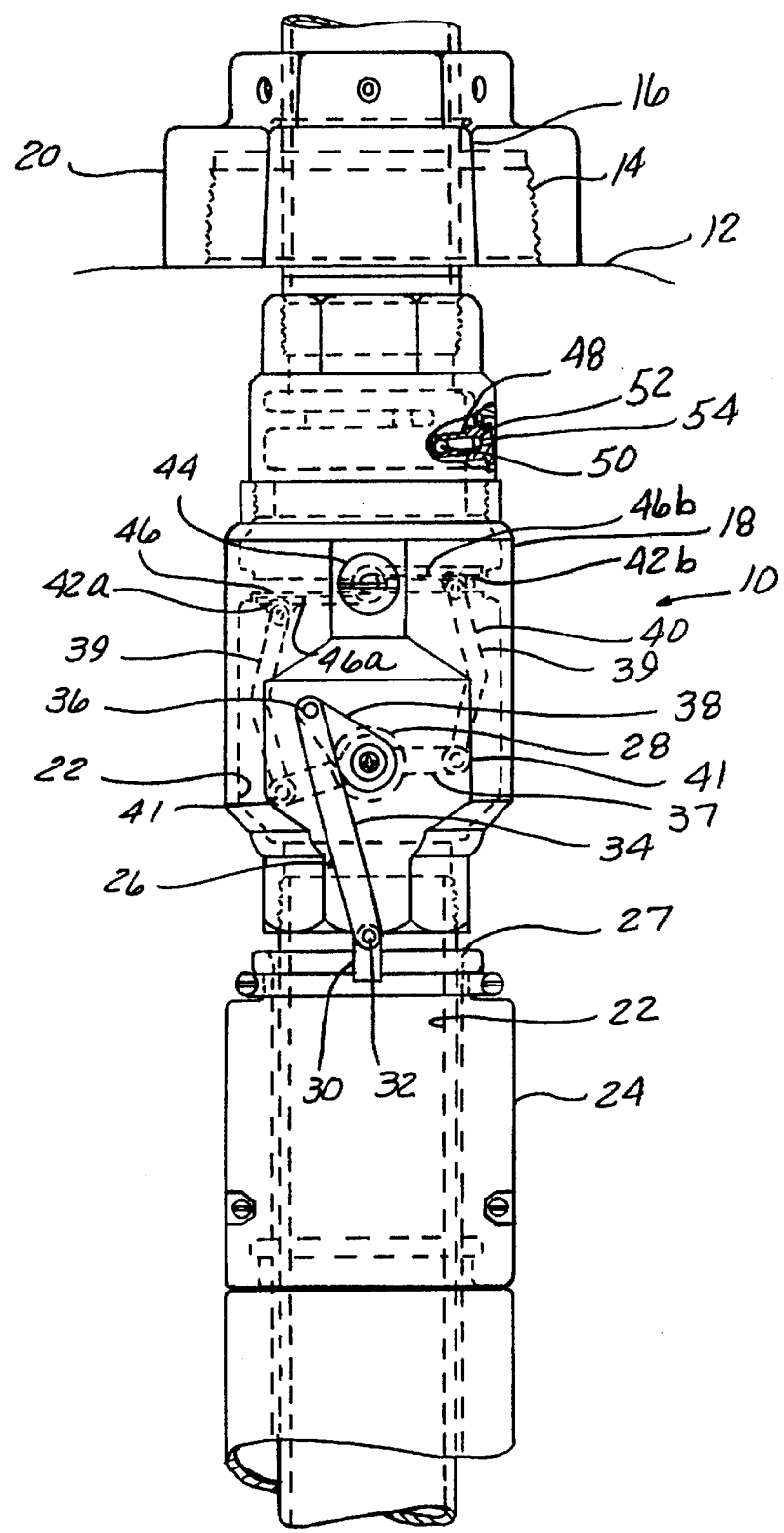
FIG. 1 is an overall side elevational view of a valve assembly embodying the first embodiment of the present invention with the valve in the closed position.
Figure 2:
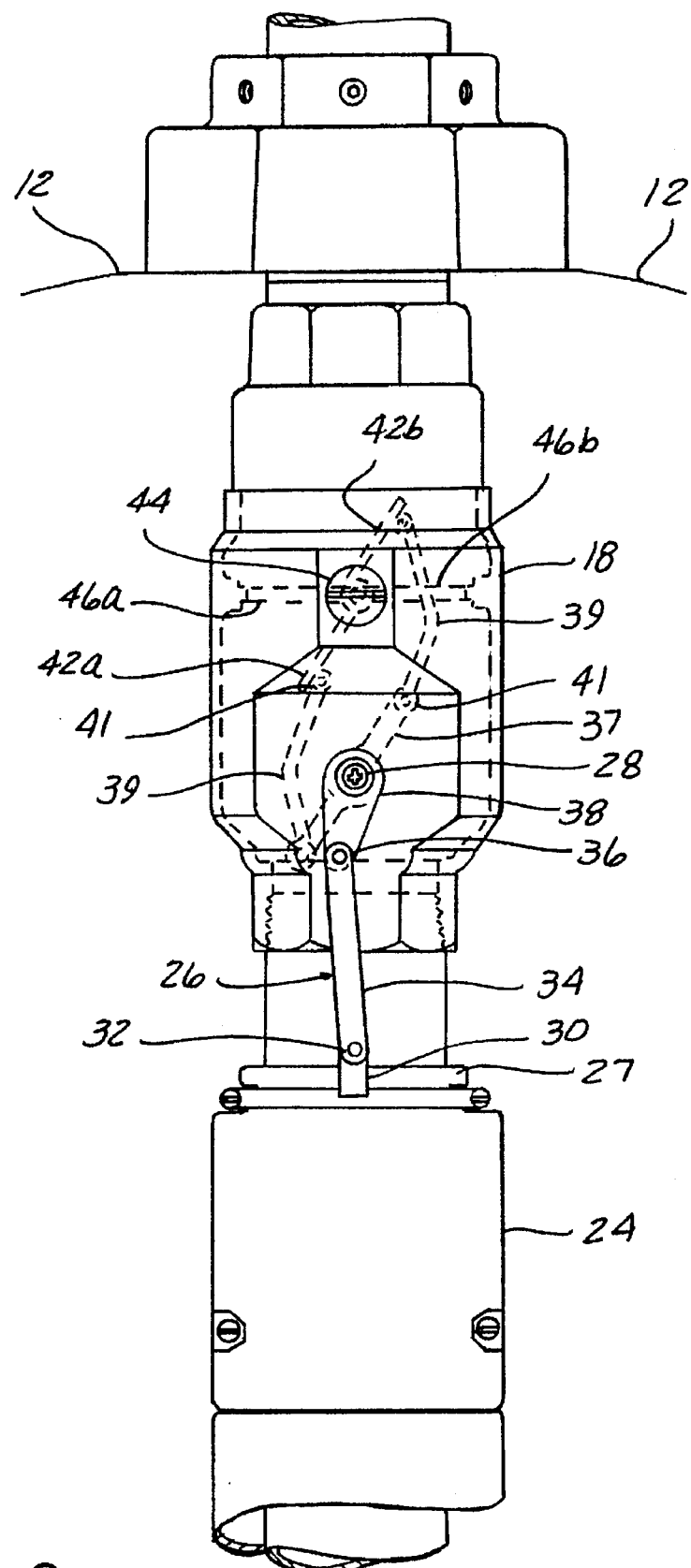
FIG. 2 is a side elevational view of the valve assembly of FIG. 1 showing the valve in the open position.
Figure 3:
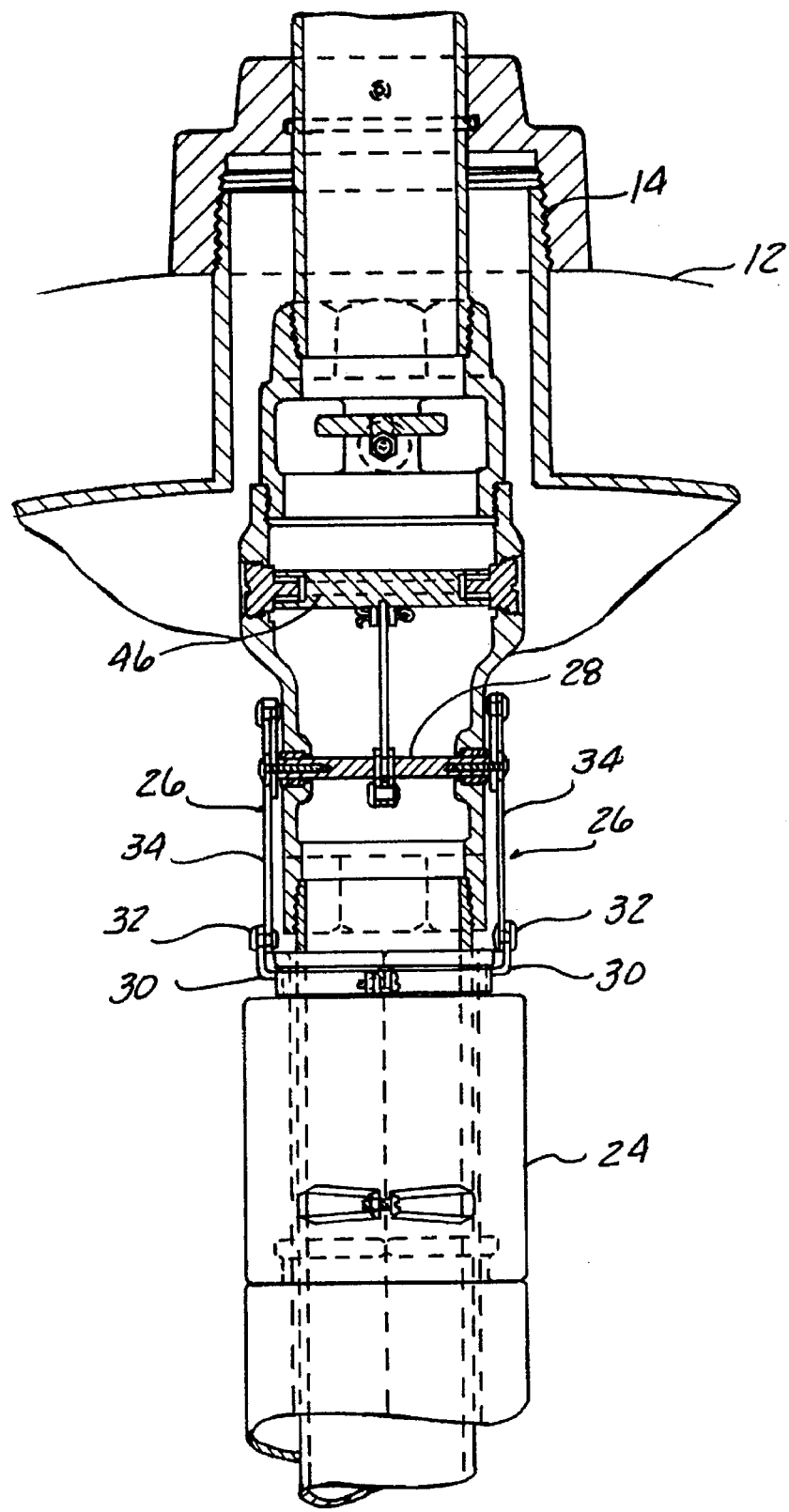
FIG. 3 is a side elevational view of the valve assembly of FIGS. 1 and 2 showing further details of the valve assembly.

The overall arrangement of a valve assembly embodying the first embodiment of the present invention is best seen in FIGS. 1–3. The valve assembly 10 extends downwardly through the top of an above-ground fuel storage tank 12. A coupling member 14 is threadably and sealingly secured to the upper end of a fill pipe 16. The valve assembly includes a cylindrical valve housing 18 mounted to the lower end of the fill pipe which extends downwardly through a riser 20 welded to the top of the storage tank 12. The valve housing 18 provides a drop tube 22 forming a fluid flow passageway for incoming fuel to direct the incoming fuel downward into the storage tank 12 under pressure.

A hollow cylindrical float 24 is provided at the bottom of the valve assembly 10 proximate to the exit or open end of the drop tube 22. The float 24 is coaxially mounted along the outer surface 19 of the valve housing 18 and is free to slide vertically along the lower portion of the valve housing 18 or drop tube 22. The float 24 moves with the fluctuation of the fluid level within the storage tank 12 and is restricted in its movement by linkage assemblies. A pair of first linkage assemblies 26 are connected to an upper end 27 of the float 24 at one end of the assembly 26 and to a first centrally disposed pivot pin 28 that extends through the valve housing 18 and the fluid flow passageway. The pair of first linkage assemblies 26 is mounted to the outside of the valve housing 18 such that each linkage assembly is diametrically opposed from the other linkage assembly with respect to the valve housing 12. Each diametrically opposed linkage assembly 26 comprises three links. The first link 30, as shown in FIG. 3, has an L-shaped configuration with one end rigidly connected to the float 24 and an opposing end connected to a first pivot pin 32. The second link 34 is pivotally connected to the first link 30 at the first pivot pin 32 and extends upwardly and away from the float 24 to be connected to a second pivot pin 36 at its opposite end. The third link 38 is fixedly mounted to the second pivot pin 36 at one end and to the centrally disposed pivot pin 28 such that the centrally disposed pivot pin 28 rotates with the vertical displacement of the float 24.

The first centrally disposed pivot pin 28 is also connected to a second set of linkage assemblies 40 disposed in the fluid flow passageway or drop tube 22 of the valve housing 18. The first ends of the second linkage assemblies 40 are pivotally connected to the first central disposed pivot pin 28, and the opposing ends of the second linkage assemblies 40 are each connected to a valve door 42a, 42b. The second linkage assemblies 40 include a pair of first 37 and second 39 links connected at pivot pin 41. Each pair of first 37 and second 39 links extend from the first centrally disposed pivot pin 28 to a pair of valve doors 42a, 42b. The pair of valve doors 42a, 42b are pivotally connected to a second centrally disposed pivot pin 44 that extends through the fluid flow passageway or drop tube 22 and is positioned vertically above the first centrally disposed pivot pin 28. Each valve door 42a, 42b when in the horizontal position extends approximately half way across the passageway or drop tube 22 such that when both valve doors 42a, 42b are in the horizontal position, fluid flow is prevented from passing through the drop tube or passageway 22. The valve doors 42a, 42b pivot about the second centrally disposed pivot pin 44, moving in the same rotational direction such that one valve door 42a moves upward while the other valve door 42b is moving downward with the movement of the second linkage assembly 40. An annular valve seat 46 is provided for the valve doors 42a, 42b such that when the valve doors 42a, 42b are closed against the valve seat 46, fluid flow is prevented from passing through the passageway 22. The valve door 42a rests against the lower ledge 46a of the valve seat 46 when in the closed position and moves in a downward direction toward the open position. The valve door 42b rests against the upper ledge 46b of the valve seat 46 when in the closed position.

When the fuel level in the storage tank 12 is less than full, the float 24 is normally in a vertically downward position. The first linkage assembly 26 is essentially in a vertically downward position such that the first centrally disposed pivot pin 28 has pivoted in a counterclockwise rotational movement. The second linkage assembly 40, as a result, pivoted in a counterclockwise movement to pivot valve doors 42a, 42b in unison about second centrally disposed pivot pin 44 away from annular valve seat 46 as seen in FIG. 2.

As the storage tank 12 begins to fill and the level of fuel begins to rise, the float 24 rises vertically upward, thereby moving the first 30 and second 34 links of the first linkage assembly 26 essentially vertically upward. As first and second links 30, 34 move upward, third link 38 pivots the first centrally disposed pivot pin 28 in a clockwise rotational movement. As pivot pin 28 rotates clockwise, the pair of first links 37 of the second linkage assembly 40 also move in a clockwise movement. The corresponding pair of second links 39 move in unison with the pair of first links 37, such that valve door 42b pivot toward lower edge 46a of annular valve seat 46 and valve seat 46b pivots downwardly toward upper edge 46b of annular valve seat 46. Once the valve doors 42a, 42b are against their respective seats 46a, 46b, the fluid flow passageway 22 is entirely closed to further flow of fuel to the storage tank 12.

A check ball valve 48 is provided in the fuel flow passageway 22 and located upstream from the valve doors 42a, 42b. A check ball valve 48 provides a bleed orifice 54 for allowing excess fuel to bleed into the storage tank 12. The check ball valve 48 is horizontally disposed through the outer wall 49 of the housing 18 at a slight incline so that the ball 50 is in the normally unseated position with the absence of pressure. When fuel is being pumped into the storage tank 12 under pressure, the check ball 50 is forced back into the valve seat 52 thus preventing fuel from escaping through a bleed orifice 54. When the valve doors 42a, 42b close and a fuel flow is shut off, a certain amount of excess fuel is captured within the valve housing 18 above the valve doors 42a, 42b. When fluid flow is shut off, and the pressure is relieved, the check ball 50 unseats from the valve seat 52 to allow fuel to bleed through the orifice 54 into the storage tank 12.

Figure 4:
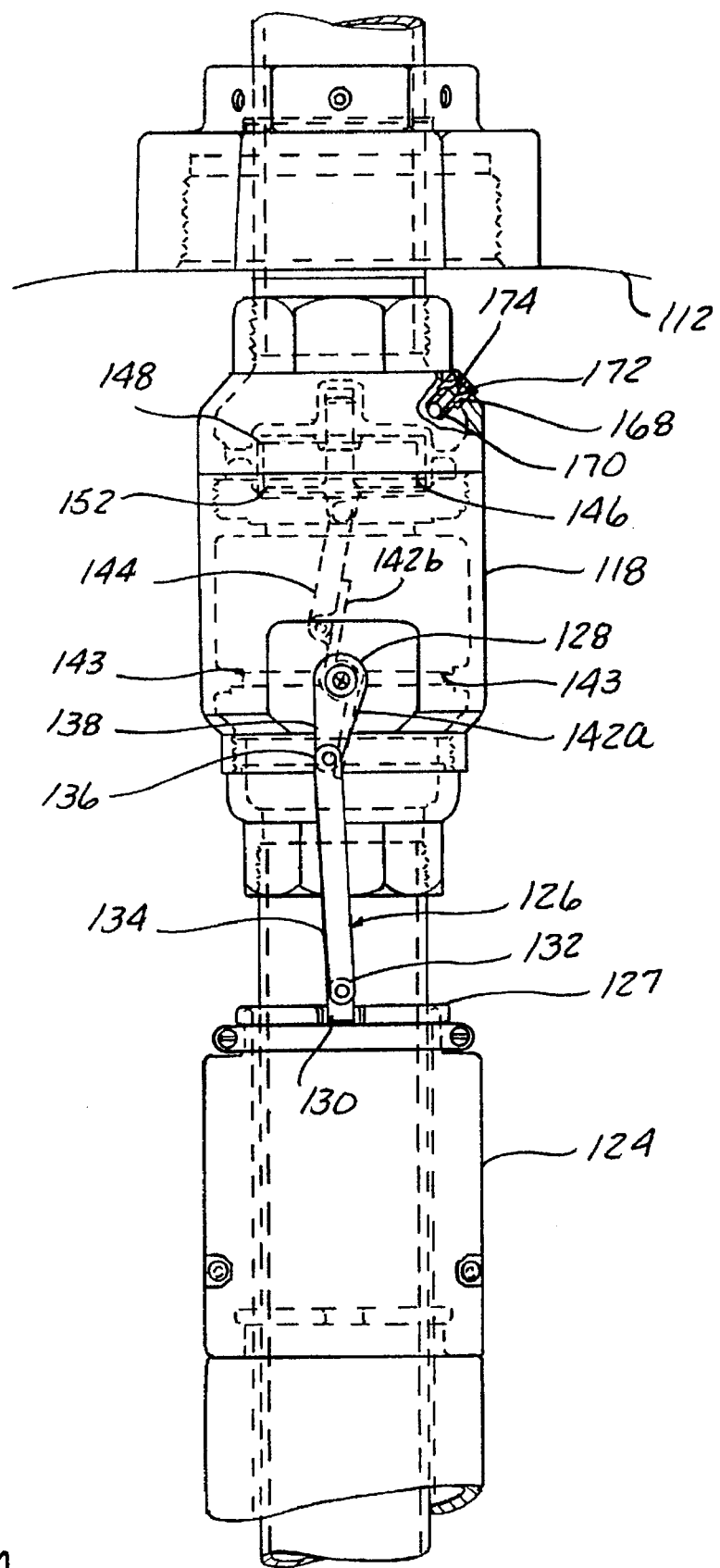
FIG. 4 is a side elevational view of the valve assembly in the open position embodying the second embodiment of the present invention.
Figure 5:
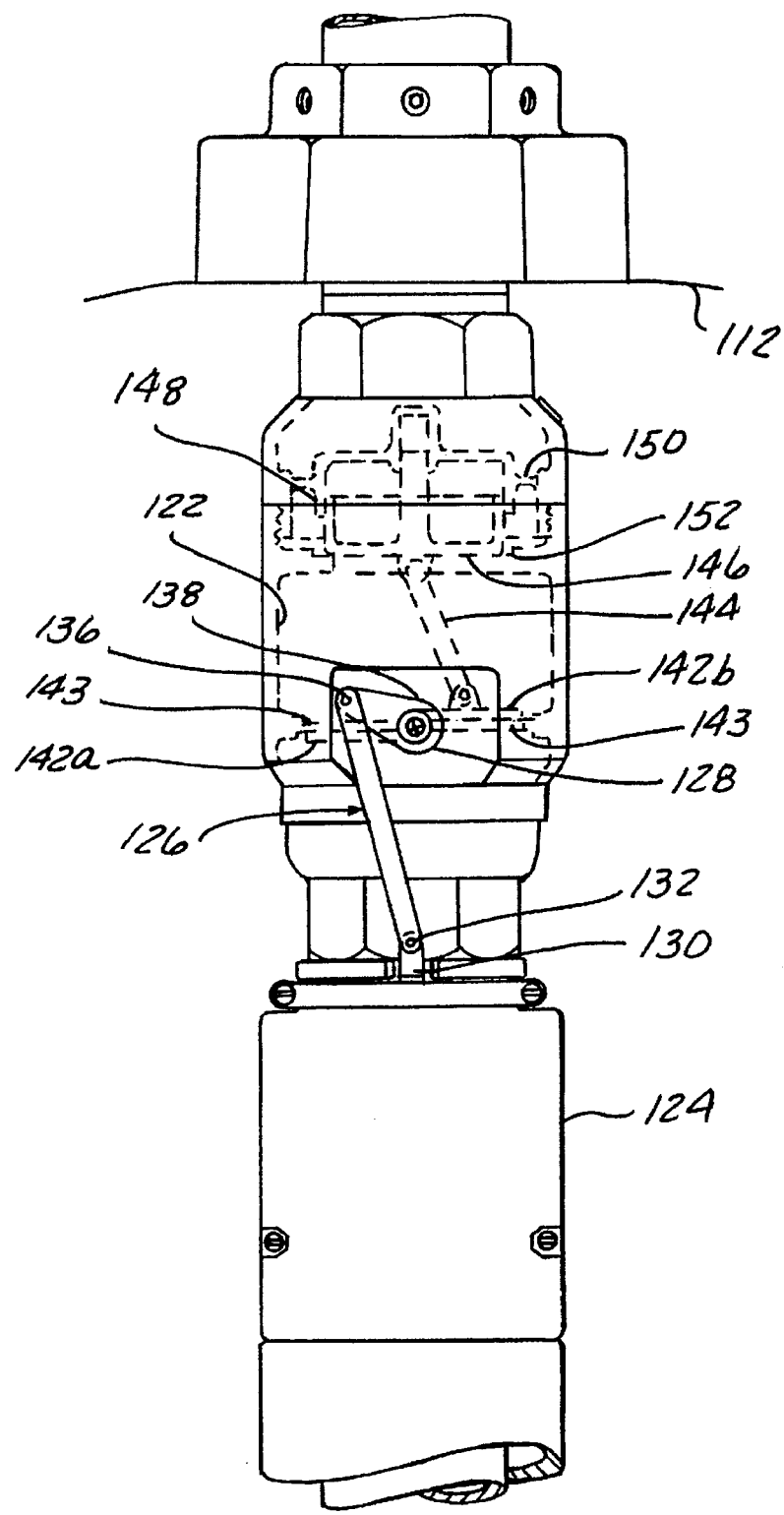
FIG. 5 is a side elevational view of the valve assembly of FIG. 4 in the closed position.

A second embodiment is shown in FIGS. 4 and 5. In this embodiment, the valve assembly includes a similar float as in the first embodiment wherein the float is a hollow cylindrical structure that is coaxially mounted along the outside surface of the exit pipe leading into the storage tank. In the second embodiment, the valve assembly further has a first linkage assembly 126 similar to the first embodiment having diametrically opposed linkages along the outside surface of the valve assembly. The float 124 moves correspondingly with the fluctuation of the fluid level within the storage tank 112 and is restricted in its movement by linkage assemblies 126. A pair of first linkage assemblies 126 are connected to an upper end 127 of the float 124 at one end of the assembly 126 and to a centrally disposed pivot pin 128 that extends through the valve housing 118 and the fluid flow passageway 122. The pair of first linkage assembly 126 is mounted to the outside of the valve housing 118 so that each linkage assembly diametrically opposite from the other linkage assembly. Each diametrically opposed linkage assembly comprises three links. The first link 130 has the same L-shaped configuration as in the first embodiment having one end rigidly connected to the top 127 of float 124 and an opposing end connected to a pivot pin 132. The second link 134 is pivotally connected to the first link 130 at the pivot pin 132 and extends upwardly and away from the float 124 to be connected to a second pivot pin 136 at its opposite end. The third link 138 is fixedly mounted to the second pivot pin 136 at one end and to the centrally disposed pivot pin 128 such that the centrally disposed pivot pin 128 rotates with the vertical displacement of the float 124. The valve doors 142a, 142b are directly attached to the centrally disposed pivot pin 128. One of the valve doors 142b is pivotally connected to a rigid link 144 which in turn is pivotally connected to a piston 146. The piston 146 is centrally disposed within the fuel flow passageway 122 and has reciprocal movement within a recess 148 centrally disposed in the passageway 122 upstream from the valve doors 142a, 142b. A webbed support 150 provides support for the recess 148 structure that receives the piston 146 but allows fluid to pass through the fluid flow passageway 122 around the piston 146. An annular shoulder 152 is located in the fluid flow passageway 122 for providing a valve seat 152 so that the piston 146 may seat and seal to prohibit the flow of fuel from passing through the fuel flow passageway 122.

When the fuel level in the storage tank 112 is less than full, the float 124 is normally in a vertically downward position, as seen in FIG. 4. When the float 124 is in the lower position, the first linkage assembly 126 is essentially in a vertically downward position and the valve doors 142a, 142b have been pivoted about centrally disposed pivot pin 128 in a counterclockwise rotational movement such that the valve doors 142a, 142b are unseated from their corresponding valve seats 143. The valve doors 142a, 142b are essentially in a vertical position so that the fluid flow passageway 122 remains open for flow of fuel into the storage tank 112. In addition, the rigid link 144 moves upward with the counterclockwise movement of valve door 142b to unseat the piston 146 from seat 152.

As the storage tank 112 begins to fill and the level of fuel begins to rise, the float 124 rises vertically upward thereby moving the first linkage assembly 126 in an upward and a clockwise direction. As the first linkage assembly 126 moves in an upward and clockwise direction, first linkage assembly 126 pivots the valve doors 142a, 142b also in a clockwise direction toward the respective valve seats 143. As the valve doors 142a, 142b move toward their respective seats 143, the piston 146 lowers towards the piston seat 152 in order to obstruct the flow of fuel flowing through the fluid flow passageway.

The second embodiment further includes a check ball valve 168 similarly provided above the piston 146 in the passageway for allowing excess fuel to bleed into the storage tank 112. A check ball valve 168 provides a bleed orifice 174 for allowing excess fuel to bleed into the storage tank 112. The check ball valve 168 is horizontally disposed through the outer wall 149 of valve housing 118 at a slight incline so that the ball 170 is in the normally unseated position with the absence of pressure. When fuel is being pumped into the storage tank 112 under pressure, the check ball 170 is forced back into the valve seat 172 thus preventing fuel from escaping through a bleed orifice 174 located adjacent the valve seat 172. When the valve doors 142a, 142b close and fuel flow is shut off, a certain amount of excess fuel is captured within the valve housing 118 above the valve doors 142a, 142b. When fluid flow is shut off, and the pressure is relieved, the check ball 170 unseats from the valve seat 172 and fuel is allowed to bleed through the orifice 174 directly into the storage tank 112.

Figure 6:
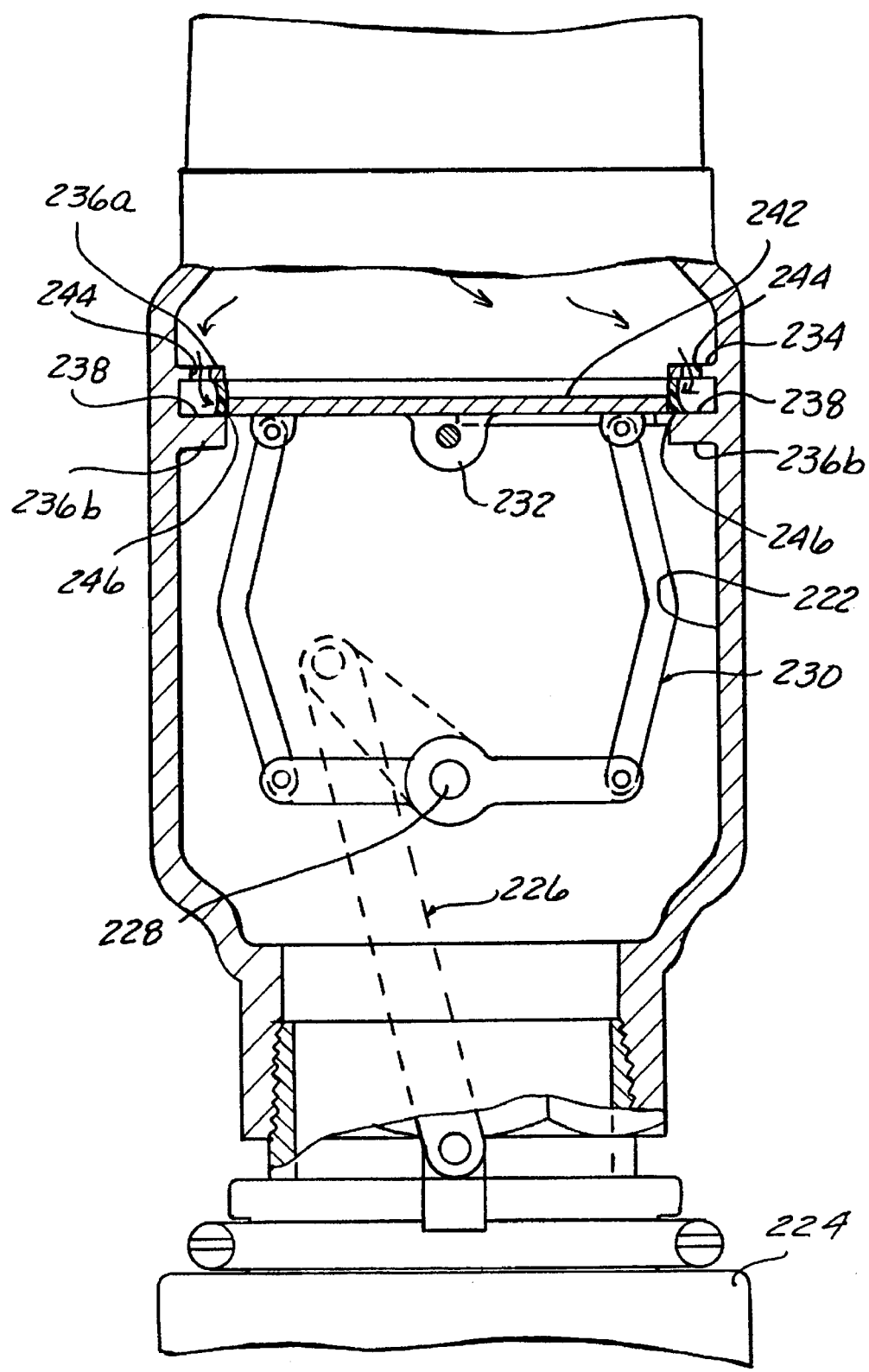
FIG. 6 is a partial side elevational view of the valve assembly embodying the third embodiment of the present invention.

A third embodiment of the shut-off valve assembly is shown in FIG. 6. This embodiment utilizes the same float 224 and first linkage assembly 226 configuration as in the first embodiment. A first centrally disposed pivot pin 228 has a second linkage assembly 230 that is pivotally connected to a single valve door 242. The valve door 242 is pivotally connected to a second centrally disposed pivot pin 232 for rotation about its centrally disposed pivot axis. An annular shelf 234 extends radially inward into the passageway 222 to provide a positive stop for the rotation of the valve door 242. The annular shelf 234 is formed by a pair of adjacent annular extensions 236a, 236b, extending inwardly into the flow path 222. The annular extensions 236a, 236b form a recess 238 therebetween. The upper annular extension 236a has an aperture 244 which allows fluid to flow into the recessed area 238. Connecting the two extensions 236a, 236b inwardly is a flexible membrane 246 that moves with the fluid force within the recess 238. When fluid is filled behind the flexible membrane 246, the membrane 246 expands inwardly such that when the valve door 242 is rotated to the closed position, the periphery of the valve door 242 seals against the flexible membrane 246.

In operation, the float 224 is vertically downward when the fuel level in the storage tank 212 is less than full, thus allowing for a counterclockwise rotation of the valve door 242 and the opening of the fuel flow passageway. As the fuel level rises during the filling of the fuel storage tank 212, a portion of the fuel flows through aperture 244 and is trapped in the recess 238, thereby expanding the flexible membrane 246. As the fuel level rises, the float 224 rises thus pivoting first centrally disposed pivot pin 228 in a clockwise rotational movement just as in the first embodiment. As pivot pin 228 rotates clockwise, the second linkage assembly 230 pivots thereby turning the valve door 242 in a clockwise direction about second centrally disposed pivot pin 232 to seat the valve door 242 against the flexible membrane 246. When the fuel is shut-off, and the pressure is released, the flexible membrane 246 recedes from its stretched and expanded position and excess fuel is allowed to bleed between the flexible membrane 246 and the valve door 242.

Figure 7:
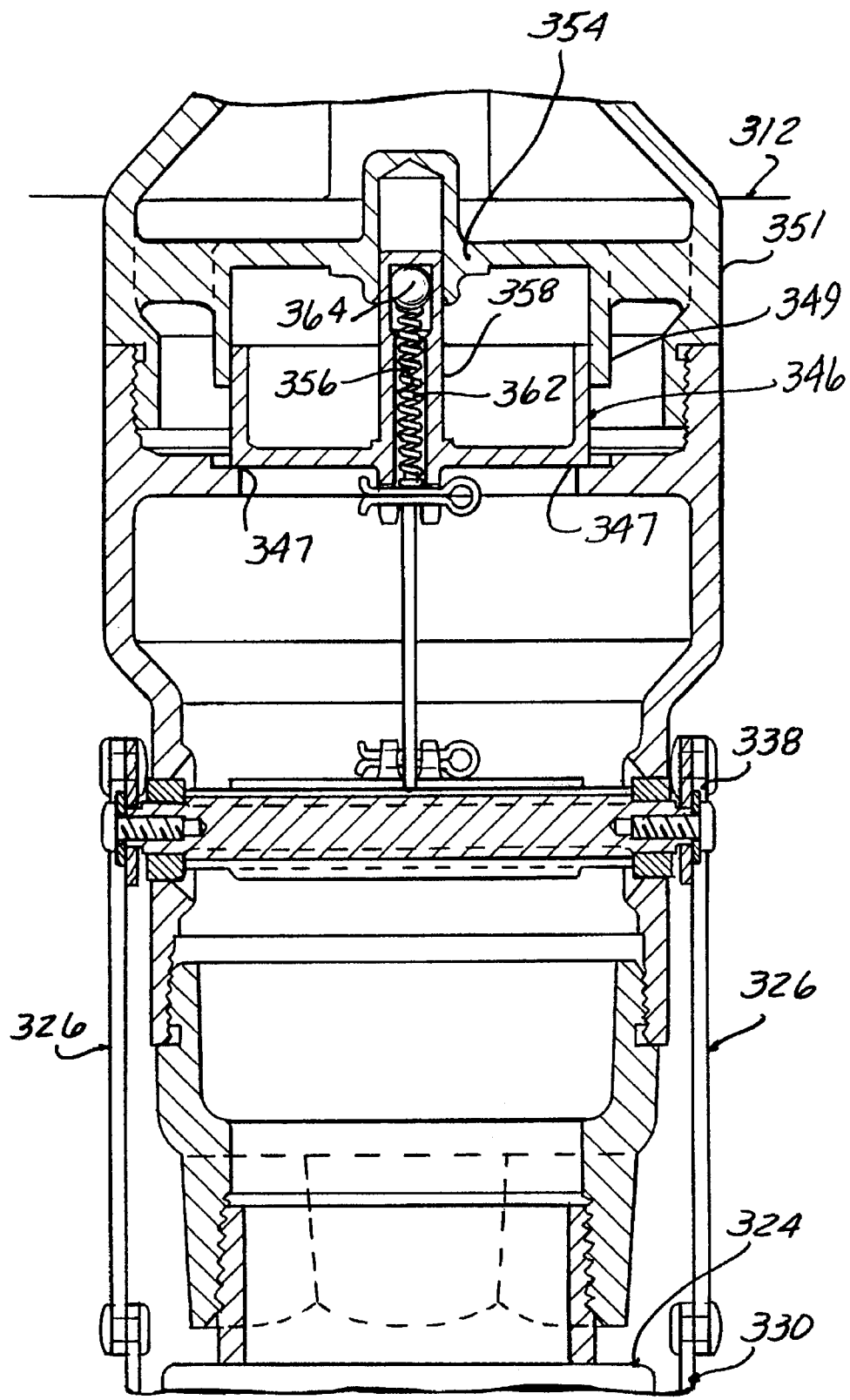
FIG. 7 is a side elevational view of the valve assembly embodying the fourth embodiment of the present invention.
Figure 8:
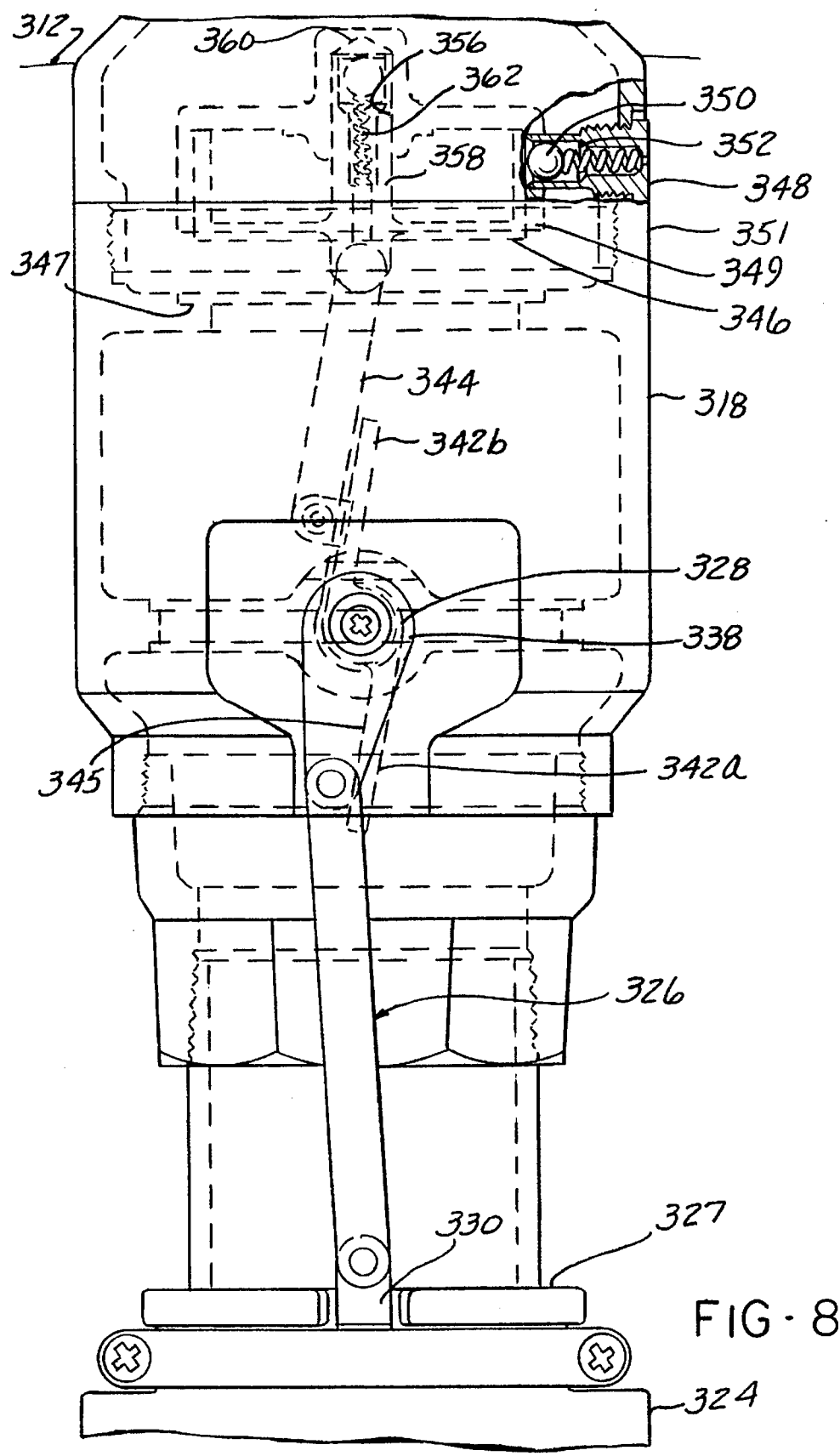
FIG. 8 is a side elevational view of the valve assembly of FIG. 7 showing further details of the valve assembly.

A fourth embodiment is shown in FIGS. 7 and 8. This embodiment incorporates similar features as the second embodiment with a few additional changes. In this embodiment, the valve assembly includes a similar float 324 as in the previous embodiments wherein the float 324 is a hollow cylindrical structure that is coaxially mounted along the outside surface of the exit pipe leading into the storage tank 312. In the fourth embodiment, the valve assembly further has a first linkage assembly 326 having diametrically opposed linkages along the outside surface of the valve assembly similar to that described in the first and second embodiments. The float 324 moves with the fluctuation of the fluid level within the storage tank 312 and is restricted by its movement by the first linkage assemblies 326. A pair of first linkage assemblies 326 are connected to an upper end 327 of the float 324 at one end of the assembly and to a centrally disposed pivot pin 328 that extends through the valve body and the fluid flow passageway. The pair of first linkage assemblies 326 are mounted to the outside of the valve housing 318 such that each linkage assembly is diametrically opposite from the other linkage assembly. Each diametrically opposed linkage assembly comprises three links. The first link 330 is rigidly connected to the float 324 and through the series of three links, the later most link 338 is fixedly mounted to a pivot pin 328 centrally disposed in the passageway 322 such that it rotates with the vertical displacement of the float 324. Similar to the second embodiment, the valve doors 342a, 342b are directly attached to the centrally disposed pivot pin 328. One of the valve doors 342b is pivotally connected to the rigid link 344 which in turn is pivotally connected to a piston 346. A difference between this fourth embodiment and the previously discussed second embodiment is that an aperture 345 is provided in one of the butterfly valve doors 342a; and especially in the butterfly valve door 342a which swings upward toward the closed position. The purpose of the aperture 345 is to reduce the surface area of the upwardly swinging butterfly valve door 342a in order that the opposite valve door 342b has a greater surface area than valve door 342a so that fluid flow forces the butterfly valve door 342b downward toward the closed position at a greater force than the force applied to the butterfly valve door 342a swinging upwardly.

A second change includes a check ball valve 348 which is mounted horizontally through the housing wall 351 and through the dash pot wall 349 which slidingly supports a poppet valve 346. The horizontally mounted check ball valve 348 communicates between atmospheric pressure and into storage tank 312 so that if any vacuum is created in the dash pot 349 or poppet valve 346, the ball 350 in the check valve 348 becomes unseated from the check valve seat 352 so that atmospheric pressure relieves the vacuum. After closing or after the poppet valve 346 moves directly onto seat 347, the pressure of the fluid seats the ball 350 and prevents fluid from escaping.

A third change includes a bore 356 which is provided in the dash pot housing 354 for slidingly receiving the poppet stem 358. The bore 356 extends through the bottom of stem 358 and is closed at the upper end 360 of the dash pot housing 354. A spring 362 and check ball 364 are provided in the poppet stem 358 to relieve pressure within the bore 356 and the dash pot housing 354 to allow the poppet valve 346 to move toward the upward and open position.

Figure 9:
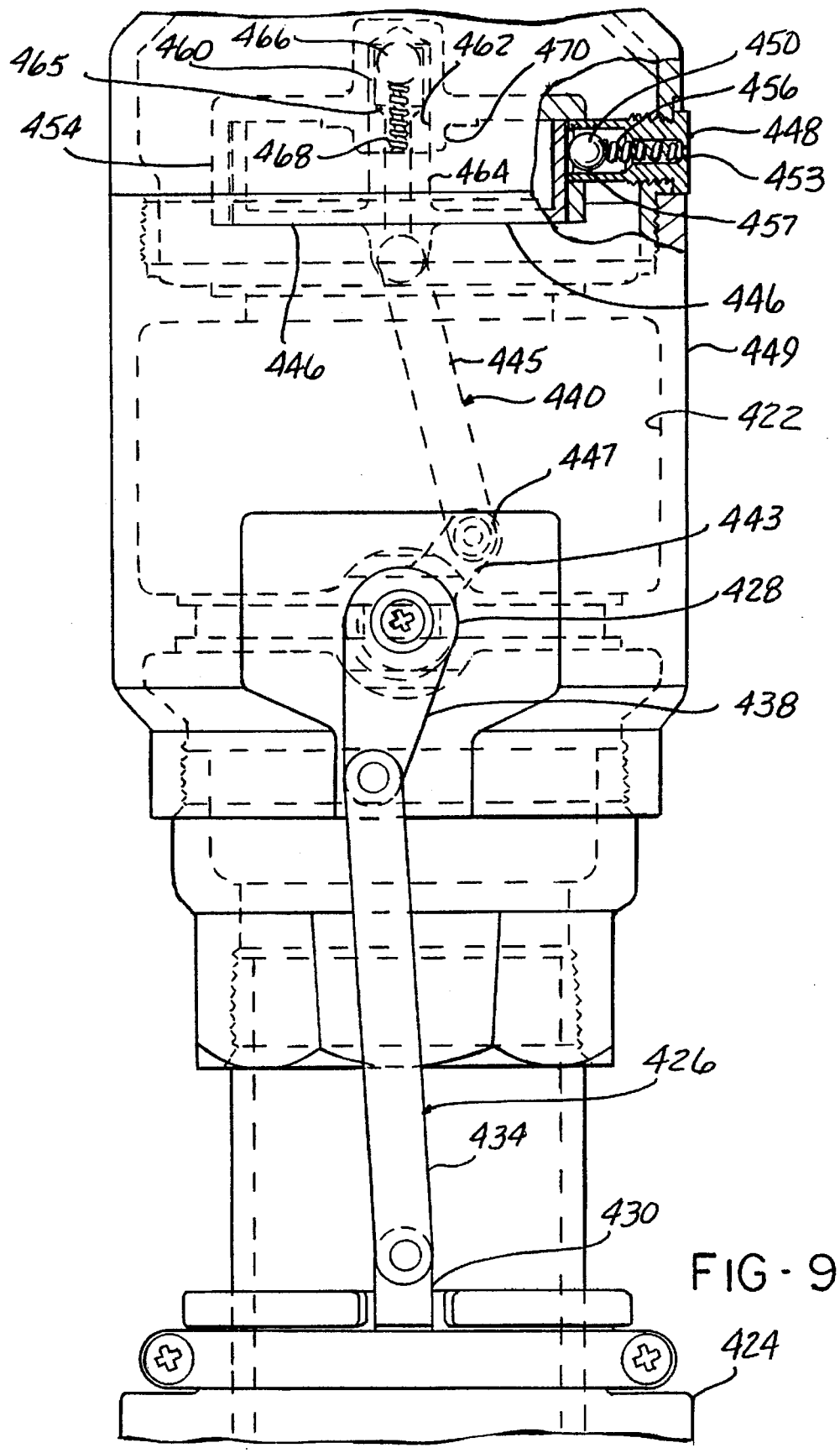
FIG. 9 is a side elevational view of the valve assembly in the open position embodying the fifth and preferred embodiment of the present invention in the open position.
Figure 10:
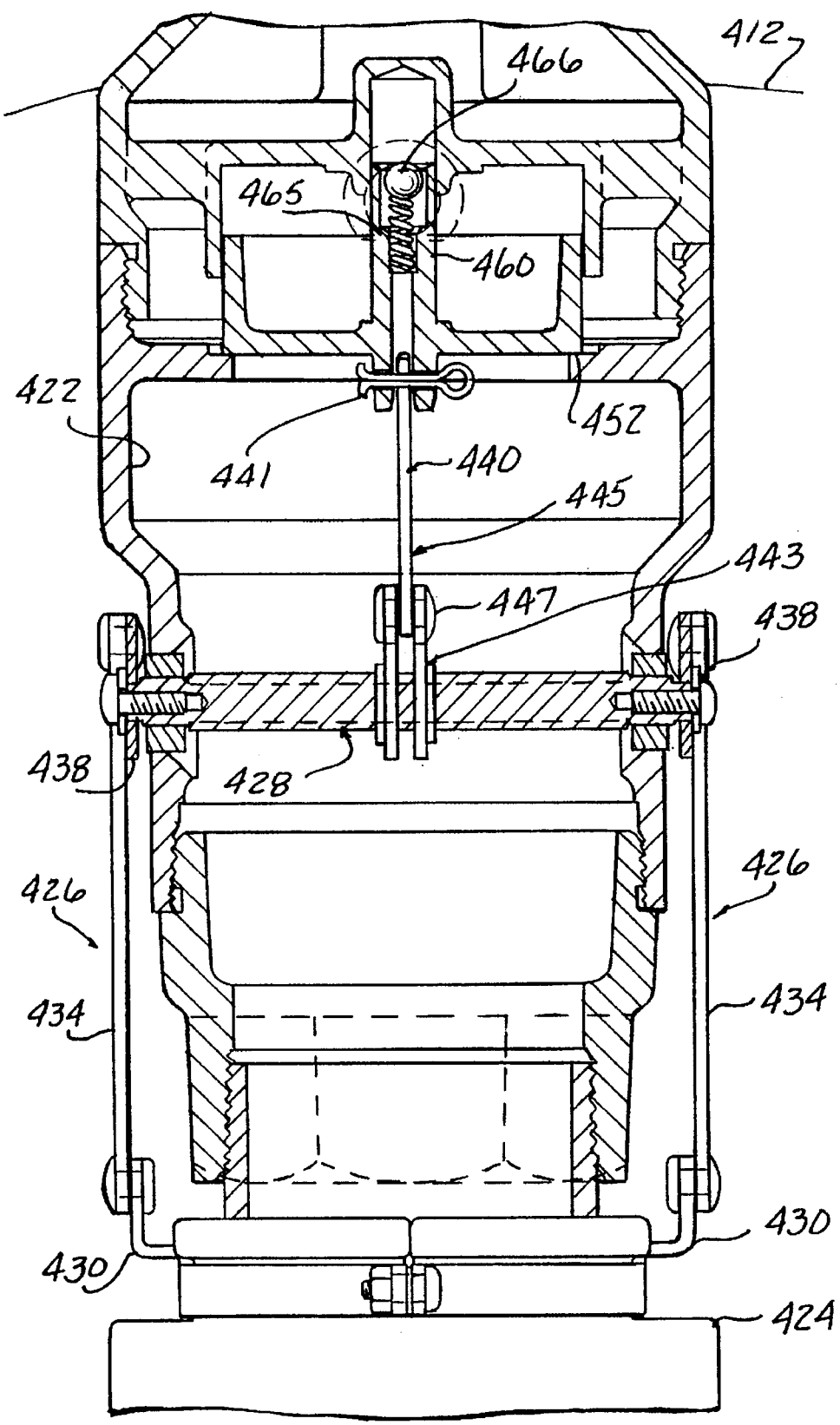
FIG. 10 is a side elevational view of the valve assembly of FIG. 9 in the closed position showing further details of the valve assembly.

FIGS. 9 and 10 show the valve assembly incorporating the fifth and preferred embodiment of the invention. In the preferred embodiment, the butterfly valve doors are eliminated. A first linkage assembly 426 is connected to the float 424 at one end as described in detail in the previous embodiments and is also connected to a centrally disposed pivot pin 428 at the other end. The first linkage assembly 426 includes the set of three links 430, 434 and 438 diametrically opposed to a similar set of three links as discussed in the first embodiment. A second linkage assembly 440 is pivotally connected to the centrally disposed pivot pin 428 at one end and to a poppet valve 446 at the other end. The second linkage assembly 440 is located in the fluid flow passageway 422 and connected to the poppet valve 446 by a cotter pin 441. The second linkage assembly 440 includes flexible link 443 connected to centrally disposed pivot pin 428 and link 445 connected to poppet valve 446 by cotter pin 441. Flexible link arm 443 and link 445 are pivotally connected to each other at pivot pin 447. The poppet valve 446 is slidably disposed within a dash pot housing 454 for vertical movement between a closed position and an open position in response to the movement of the float 424. Poppet valve 446 is in the closed position when valve 446 is set against annular seat 452.

A bleeder check ball valve 448 is mounted horizontally through the housing wall 449 and dash pot housing wall 455. The horizontally mounted check ball valve 448 bleeds fluid into the storage tank 412 through aperture 453 when the ball 450 is unseated from seat 457. A second check ball valve 460 is located in a bore 462 of the poppet valve stem 464. A ball 466 and spring 468 combination allows fuel to flow passed the ball 466 and through bore 462 to the storage tank 412 when ball 466 is unseated.

In operation, as the float 424 rises with the fluid level in the storage tank 412, the first linkage assembly 426 moves the centrally disposed pivot pin 428 and the flexible link arm 443 in a clockwise movement. As the flexible link arm 443 moves clockwise and downwardly toward the float 424, the link 445 that is attached to the poppet valve 446 lowers the poppet valve 446 against seat 452 to close the valve. A portion of the fuel fills in the gap 470 of the poppet valve 446 and exits into the storage tank 412 through bleeder check ball valve 448 and second check ball valve 460. When poppet valve 446 is closed, the pressure of the fuel forces the fuel through the check ball valves 448 and 460 by overcoming the spring forces of springs 468 and 456 so that ball 466 is seated against seat 465 and ball 450 is seated in seat 457. When the check ball valves 448 and 460 are closed, the fuel line from the fuel transport truck (not shown) jumps to indicate to the operator that the storage tank 412 is full. Once fuel is no longer entering passageway 422, and the pressure is eliminated the force of the springs 426, 468 unseat balls 450 and 456, respectively. The excess fuel above the poppet valve 446 may then bleed through the check ball valves 448 and 460 and into storage tank 412. The fuel that bleeds through stem 464 drains into passageway 422. The fuel that bleeds through bleeder check valve 448 drains through aperture 453 directly into storage tank 412.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An above ground valve assembly for preventing overfilling of a liquid storage tank via a pump connectable to a fill pipe in the top of the tank, said valve assembly comprising:

a coupling member threadably and sealingly secured to an upper end of the fill pipe;

a cylindrical valve housing having a drop tube forming a fluid flow passageway;

a single hollow cylindrical float mounted at a lower end of the fill pipe and coaxially mounted along the outer surface of the valve housing for movement with the fluctuation of the fluid level in the storage tank;

first valve means disposed in the fluid flow passageway and moveable between an open position and a closed position;

actuating means for communicating movement of the float to the first valve means; and second valve means disposed in the valve housing and moveable between an open position and a closed position, wherein said second valve means is moveable independently of said first valve means solely in response to pressure in the valve housing, the second valve means extends through the outer wall of the valve housing such that the second valve means communicates with atmospheric pressure for bleeding excess trapped fluid from above the first valve means when the first valve means is in the closed position, such that the fluid is bled to the storage tank solely after pump pressure is removed from the fluid flow passageway above the first valve means when the first valve means is closed.

2. The valve assembly of claim 1 wherein the actuating means includes a pair of first diametrically opposed linkage assemblies wherein said first linkage assembly is located external to said valve assembly.

3. The valve assembly of claim 2 wherein the pair of first diametrically opposed linkage assemblies is pivotally connected to a second linkage assembly, wherein said second linkage assembly is connected to the first valve means.

4. The valve assembly of claim 3, wherein said second linkage assembly is located internally in the valve assembly.

5. The valve assembly of claim 1, further including an annular valve seat disposed in the fluid flow passageway adjacent the first valve means, when said first valve means is in a closed position against the valve seat the fluid flow passageway is blocked prohibiting the flow of fluid through said passageway.

6. The valve assembly of claim 1 wherein the valve means includes a pair of butterfly valve doors rotating about a pivot pin connected to the actuating means, wherein one of the butterfly valve doors has an aperture to reduce the surface area of said butterfly valve door.

7. The valve assembly of claim 1 wherein the first valve means is a piston valve centrally disposed within the fluid flow passageway and having a reciprocal piston moveable within a recess corresponding to the movement of the float.

8. An above ground valve assembly for preventing overfilling of a liquid storage tank via a pump connectable to a fill pipe in the top of the tank, said valve assembly comprising:

a coupling member threadably and sealingly secured to an upper end of the fill pipe;

a cylindrical valve housing having a drop tube forming a fluid flow passageway;

a single hollow cylindrical float mounted at a lower end of the fill pipe and coaxially mounted along the outer surface of the valve housing for movement with the fluctuation of the fluid level in the storage tank;

first valve means disposed in the fluid flow passageway and moveable between an open and closed position;

actuating means for communicating movement of the float to the first valve means; and a piston valve centrally disposed within the fluid flow passageway and having a piston with reciprocal vertical movement within a recess centrally disposed in the fluid flow passageway upstream from the first valve means, wherein the piston has a closed position and an open position, and the piston is set against an annular seat disposed in the recess when in the closed position, the annular seat of the piston includes a pair of annular extensions into the fluid flow passageway to form a recessed area therebetween, and having a flexible membrane connected between the pair of annular extensions moveable in response to the fluid force within the recessed area for bleeding excess trapped fluid from above the first valve means when the first valve means is in the closed position, such that the fluid is bled to the storage tank between the flexible membrane and the first valve means only after pump pressure is removed from the fluid flow passageway above the first valve means when the first valve means is closed.

9. The valve assembly of claim 8 wherein said movement of the first valve means communicates movement to the piston.

10. The valve assembly of claim 8 wherein the piston valve has a stem, wherein said stem houses a poppet valve therein.

11. The valve assembly of claim 10 wherein the poppet valve in the stem includes a spring and ball wherein said spring biases the poppet valve in an open position to allow fluid therethrough.

12. A valve assembly insertible within a fill pipe of an above ground fluid storage tank for preventing the storage tank from being overfilled by a pump connectable thereto, said valve assembly comprising:

housing means for defining a fluid flow passageway connectible to the fill pipe;

valve means for selectively opening and closing the fluid flow passageway defined by the housing means;

float means, connected to the valve means, for actuating the valve means between an open position and a closed position within the fluid flow passageway in response to a fluid level within the storage tank; and bleed means for selectively communicating excess trapped of fluid within the fluid flow passageway above the valve means and into the fluid storage tank in response solely to pump pressure within the passageway, wherein the bleed means is closed while the passageway is pressurized by said pump when said valve means is open, and said bleed means is opened when pump pressure is relieved from the passageway.

13. The valve assembly of claim 12 wherein said bleed means further comprises:

the housing means having an aperture formed through a side wall defining the fluid flow passageway communicating between the fluid flow passageway upstream from the valve means and the fluid storage tank; and check valve means for closing the aperture in response to pressure within the fluid flow passageway.

14. The valve assembly of claim 13 wherein the aperture in the housing means is angled in a non-horizontal orientation and the check valve means includes a reciprocal ball disposed within the non-horizontal aperture for movement between a first position allowing fluid flow through the non-horizontal aperture in response to an absence of fluid pressure in the fluid flow passageway and a second position obstructing fluid flow through the non-horizontal aperture in response to fluid pressure being present within the fluid flow passageway.

15. The valve assembly of claim 14 wherein the bleed means further communicates with atmospheric pressure external of the housing means.

16. The valve assembly of claim 12 wherein said bleed means further comprises:

expandable bladder means, connected to the housing means and engageable with the valve means when the valve means is in the closed position and the expandable bladder means is in an expanded condition, for obstructing flow of fluid through the fluid flow passageway in cooperation with the valve means in response to fluid pressure present in the fluid flow passageway upstream with respect to the valve means.

17. The valve assembly of claim 16 wherein the expandable bladder means further comprises:

the housing means having an annular chamber defined in the fluid flow passageway with an annular aperture extending between the chamber and the fluid flow passageway, at least one passage formed in the housing means placing the chamber in fluid communication with the fluid flow passageway upstream with respect to the valve means; and a flexible bladder enclosing the annular aperture of the chamber and expandable from a first position spaced from the valve means to a second position engageable with the valve means when the valve means is in the closed position, the flexible bladder expandable in response to fluid pressure communicated to the annular chamber from the position upstream of the valve means through the at least one passage.

* * * * *